(12) United States Patent
Inova

(10) Patent No.: US 6,247,815 B1
(45) Date of Patent: Jun. 19, 2001

(54) WORK DESK WITH PANORAMIC DISPLAY

(75) Inventor: Peter J. Inova, Glendale, CA (US)

(73) Assignee: Metavision Corporation, Burbank, CA (US)

( * ) Notice: Subject to any disclaimer, the term of this patent is extended or adjusted under 35 U.S.C. 154(b) by 0 days.

(21) Appl. No.: 09/098,211

(22) Filed: Jun. 16, 1998

Related U.S. Application Data

(60) Provisional application No. 60/049,687, filed on Jun. 16, 1997.

(51) Int. Cl.$^7$ .................................................... G03B 21/28
(52) U.S. Cl. ................................................. 353/30; 353/79
(58) Field of Search ................................ 353/28, 11, 13, 353/30, 79, 122, 74, 77, 78; 348/744, 745, 806

(56) References Cited

U.S. PATENT DOCUMENTS

| | | |
|---|---|---|
| 3,101,643 | 8/1963 | McCullough . |
| 3,229,571 | 1/1966 | Howell et al. . |
| 3,472,587 | 10/1969 | Liguori .................................... 353/35 |
| 3,551,043 | 12/1970 | Neuberger et al. ..................... 353/37 |
| 3,560,644 | 2/1971 | Petrocelli ............................... 178/6.8 |
| 4,505,558 * | 3/1985 | Albers et al. .......................... 353/30 |
| 4,623,223 | 11/1986 | Kempf ................................... 350/138 |
| 4,652,100 * | 3/1987 | Medbury ............................... 352/104 |
| 4,799,739 | 1/1989 | Newswanger .......................... 350/3.7 |
| 4,961,642 * | 10/1990 | Ogino .................................... 353/38 |
| 4,974,073 | 11/1990 | Inova .................................... 358/87 |
| 5,077,154 * | 12/1991 | Corley ................................... 353/30 |
| 5,136,390 | 8/1992 | Inova et al. ........................... 358/231 |
| 5,153,621 | 10/1992 | Vogeley ................................. 353/30 |
| 5,179,440 | 1/1993 | Loban et al. .......................... 358/87 |
| 5,181,122 | 1/1993 | Ooishi .................................... 358/238 |
| 5,502,481 * | 3/1996 | Dentinger et al. ..................... 348/51 |
| 5,626,410 * | 5/1997 | Chambers et al. ..................... 353/30 |
| 5,664,353 * | 9/1997 | Brauer et al. .......................... 353/94 |
| 5,699,225 * | 12/1997 | Yavitz et al. .......................... 361/683 |
| 5,758,941 | 6/1998 | Stahl ...................................... 353/69 |
| 5,771,072 * | 6/1998 | Tokoro et al. ......................... 348/383 |
| 5,822,002 * | 10/1998 | Tokoro et al. ......................... 348/383 |
| 5,902,030 * | 5/1999 | Blanchard .............................. 353/30 |
| 5,956,000 * | 9/1999 | Kreitman et al. ...................... 345/1 |

* cited by examiner

Primary Examiner—William Dowling
(74) Attorney, Agent, or Firm—Christie, Parker & Hale, LLP

(57) ABSTRACT

There is therefore provided according to a presently preferred embodiment of the present invention, a compact and ergonomic computer workstation with a high resolution, wide angle projected display. In an exemplary embodiment, the workstation appears generally to resemble a desk with a deep surface that separates a desk section and a display section including a large projection screen. The desk section includes a desk module with a work area that is preferably shallow and wide with enough surface to accommodate computer input devices and work tools. The work area ends at a barrier between the desk and display sections and is isolated from the display mechanically. The display section includes a preferably self contained projection module consisting of a frame and sub modules of projectors, stands, integral milTors and coordinating mounting hardware that position a group of projectors below the eye line and direct the light output to a front viewing screen. The frame creates a housing for the image source and the projection apparatus that is isolated from the desk section mechanically so that forceful action taken to the desk will not be transmitted to the display section. In operation, the images are overlapped and blended to create a computer viewing and control workstation with a large, high resolution panoramic display that may be comfortably viewed by an individual or several people at the same time. With typically 2.5 or more times the resolution or pixel count of a single monitor display, this form of computer display allows the operator to assemble more visual elements on screen, open more windows, have more programs ruling and see more in a single image.

22 Claims, 6 Drawing Sheets

WORK DESK WITH PANORAMIC DISPLAY

CROSS-REFERENCE TO RELATED APPLICATIONS

This application claims the benefit of U.S. provisional patent application No. 60/049,687, filed Jun. 16, 1997, the contents of which are hereby incorporated by reference.

FIELD OF THE INVENTION

The present invention relates to a work desk, such as a computer workstation, having a high resolution panoramic display comprised of one or more images edge blended together.

BACKGROUND OF THE INVENTION

Computer displays are typically limited to workstations with a high resolution monitor. The typical resolution of the monitor is scaled such that it displays a maximum number of pixels that fit within the ergonomics of the human visual system when witnessed at a typical viewing distance, usually under two feet from the eye of the workstation operator. In numeric terms, these monitor displays for high quality images are often 1280×1024 pixels. There are monitors with fewer (e.g., 1024×768) and monitors with more pixels, the largest practical commercial units having 1920×1080 and 1600×1200 pixel displays. In size, the scale of the monitors and their comfortable viewing distance creates images on the retina of the operator of between 20 and 35 degrees.

While providing ample display resolution for many applications, existing monitors suffer from the disadvantage that their ultimate surface area, also known as visual real estate, is fixed. The present invention substantially eliminates this and other limitations of fixed resolution monitors.

SUMMARY OF THE INVENTION

There is therefore provided according to a presently preferred embodiment of the present invention, a compact and ergonomic computer workstation with a high resolution, wide angle projected display. In an exemplary embodiment, the workstation generally resembles a desk with a deep surface spaced apart from a large projection screen. The desk section of the workstation includes a work area that is preferably shallow and wide with enough surface to accommodate computer input devices and work tools. The projection/display section of the workstation preferably includes a self contained projection module consisting of a frame and submodules of projectors, stands, integral mirrors and coordinating mounting hardware that position a group of projectors below the eye line and direct the light output to a front viewing screen. The frame creates a housing for the image source and the projection apparatus that is mechanically isolated from the desk section so that forceful action taken to the desk will not be transmitted to the display section.

To use the workstation, the operator sits or stands at the desk facing the large display screen, typically positioned several feet in front of her. Between the desk and screen, the projection hardware directs the light from several projection devices in a front-surface projection display. Images are overlapped and blended using known edge blending techniques to create a computer viewing and control workstation with a large, high resolution panoramic display that may be comfortably viewed by an individual or several people at the same time. With typically 2.5 or more times the resolution or pixel count of a single monitor display, this form of computer display allows the operator to assemble more visual elements on screen, open more windows, have more programs running and see more in a single image.

DESCRIPTION OF THE DRAWINGS

These and other features of the present invention will be better understood in light of the following detailed description read in conjunction with the accompanying drawings, wherein.

DETAILED DESCRIPTION OF THE INVENTION

Figure 1:
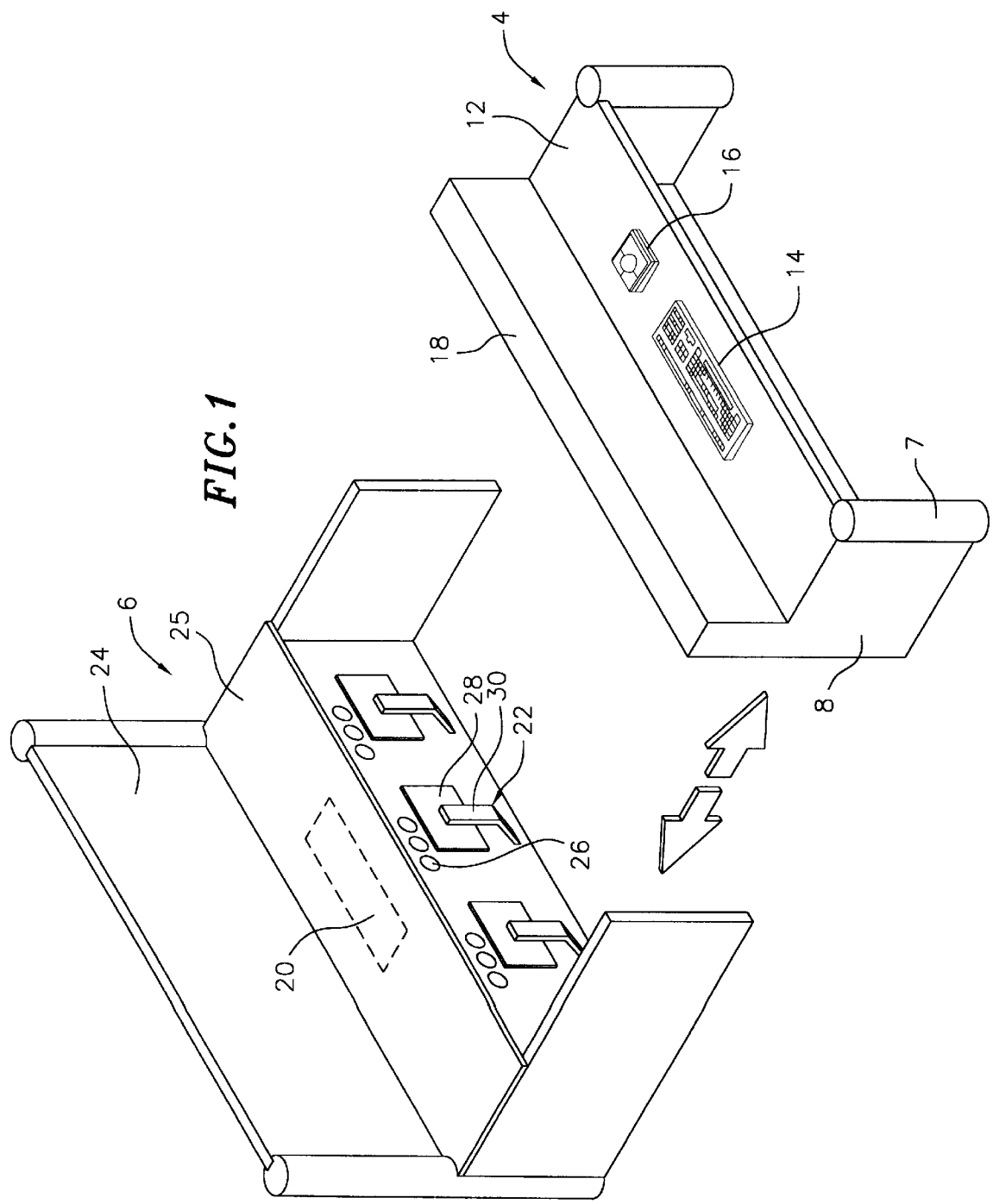
FIG. 1 is a perspective view of the desk and projection/display modules of the workstation according to a preferred embodiment of the present invention, in which the modules are spaced apart to expose certain features.

Referring to FIG. 1, a presently preferred embodiment of the present invention includes a desk module 4 and a projection/display module 6. The self standing desk module 4 includes legs and walls 7, 8 supporting an operator work surface 12 for accommodating one or more input devices 14, 16 such as, for example, a keyboard, mouse, trackball, graphics tablet, joystick, space ball, digitizing tablet or accessory touch screen, as well as writing pads, notebooks, coffee cups and other informal work tools. The desk module may be formed in a variety of shapes, sizes and designs. In a presently preferred embodiment, the desk module contains a barrier 18 at the end of the work area adjacent the projection/display module.

Figure 2:
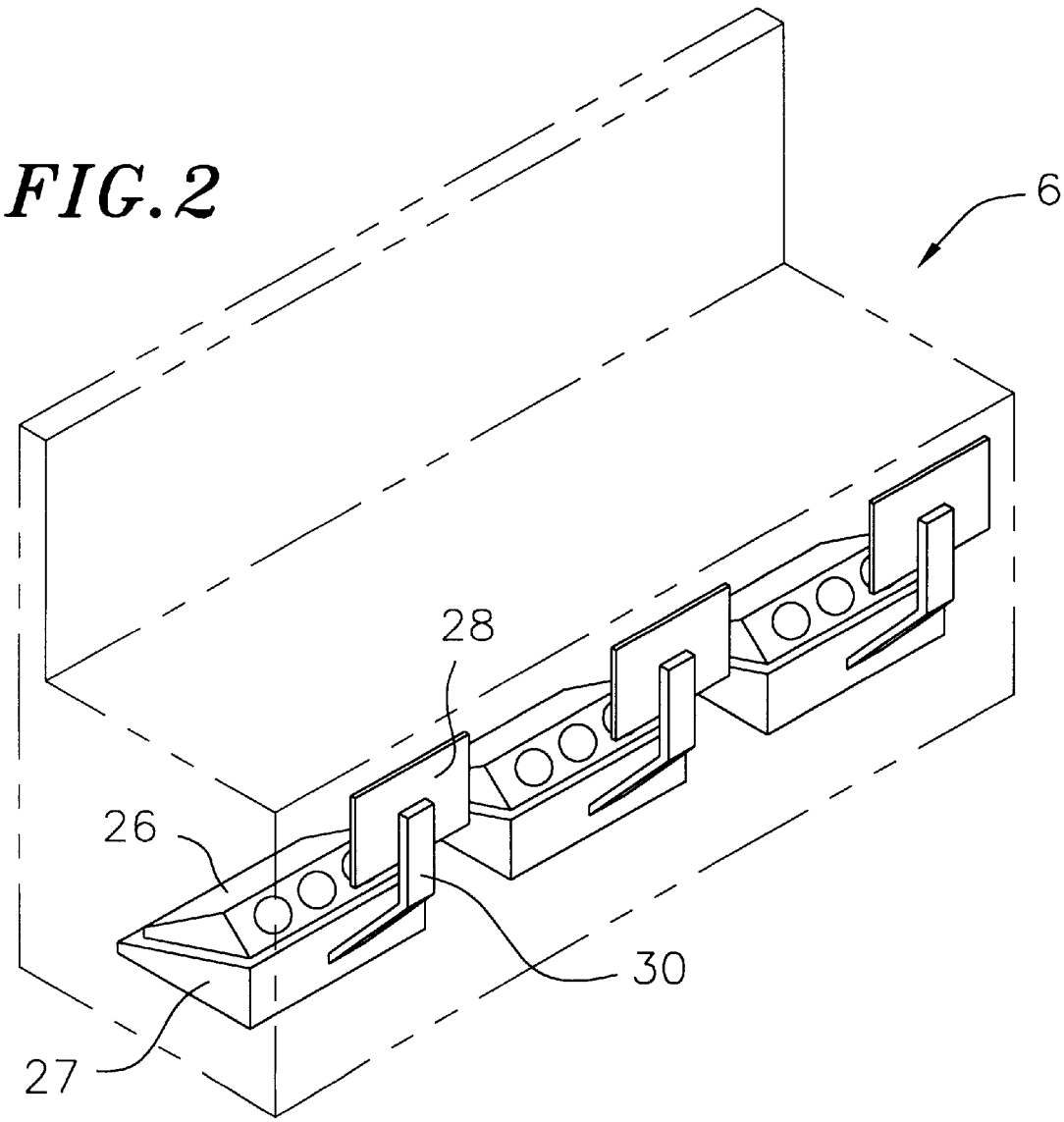
FIG. 2 is a perspective view of the projection and desk modules of FIG. 1 standing together to form the workstation.
Figure 3:
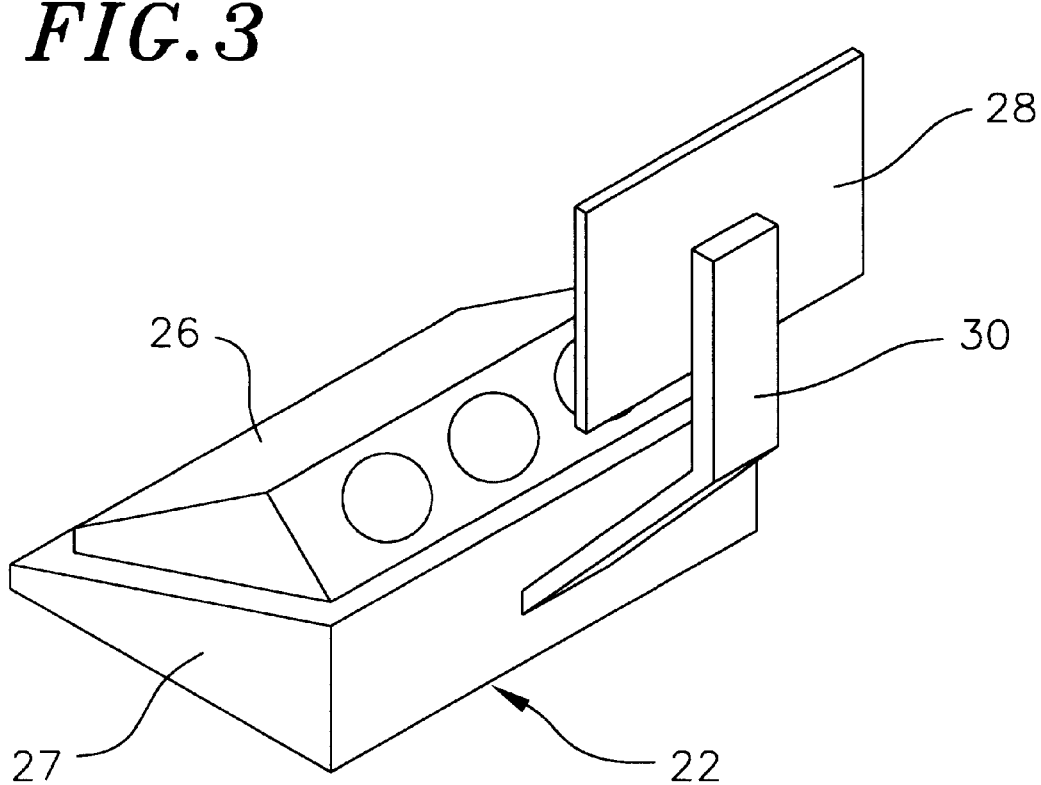
FIG. 3 is a side view of the workstation, partially in cross section, in which the light path of the projected image back to the screen is shown in relation to the operator to demonstrate the compact and ergonomic nature of the preferred embodiment.

Referring also to FIGS. 2 and 3, the projection/display module 6 includes an image source 20, projector/mirror submodules 22, a screen 24 and a cabinet 25. The projector/mirror submodules each include a projector 26 mounted on an angled projector mount 27 and a reflector, such as a mirror 28, attached to an arm 30 that extends outwardly and upwardly from the projector mount. In the preferred embodiment, three separate projectors are used, but more or less projectors may be used depending on the desired display and other factors including the sizes of the room and workstation. The projectors may be any one of a number of commercially available projectors, for example, the AmPro Model 3600 from AmPro Corporation, Melbourne, Fla. Other suitable projectors include those manufactured by Sony Corporation, Mitsubishi Corporation, and NEC Corporation.

In the presently preferred embodiment, the cabinet 25 includes a frame of covers, walls and panels for housing the projector submodules, protecting or hiding from view the image source 20, and supporting the display screen 24. The projectors 26 are arranged on the individual submodules 22 side by side within the projection module. The arrangement of the projectors, stands, mirrors and coordinating mounting hardware allows the image from the projectors to be directed from adjacent the floor back toward the display screen in a compact arrangement.

Figure 4:
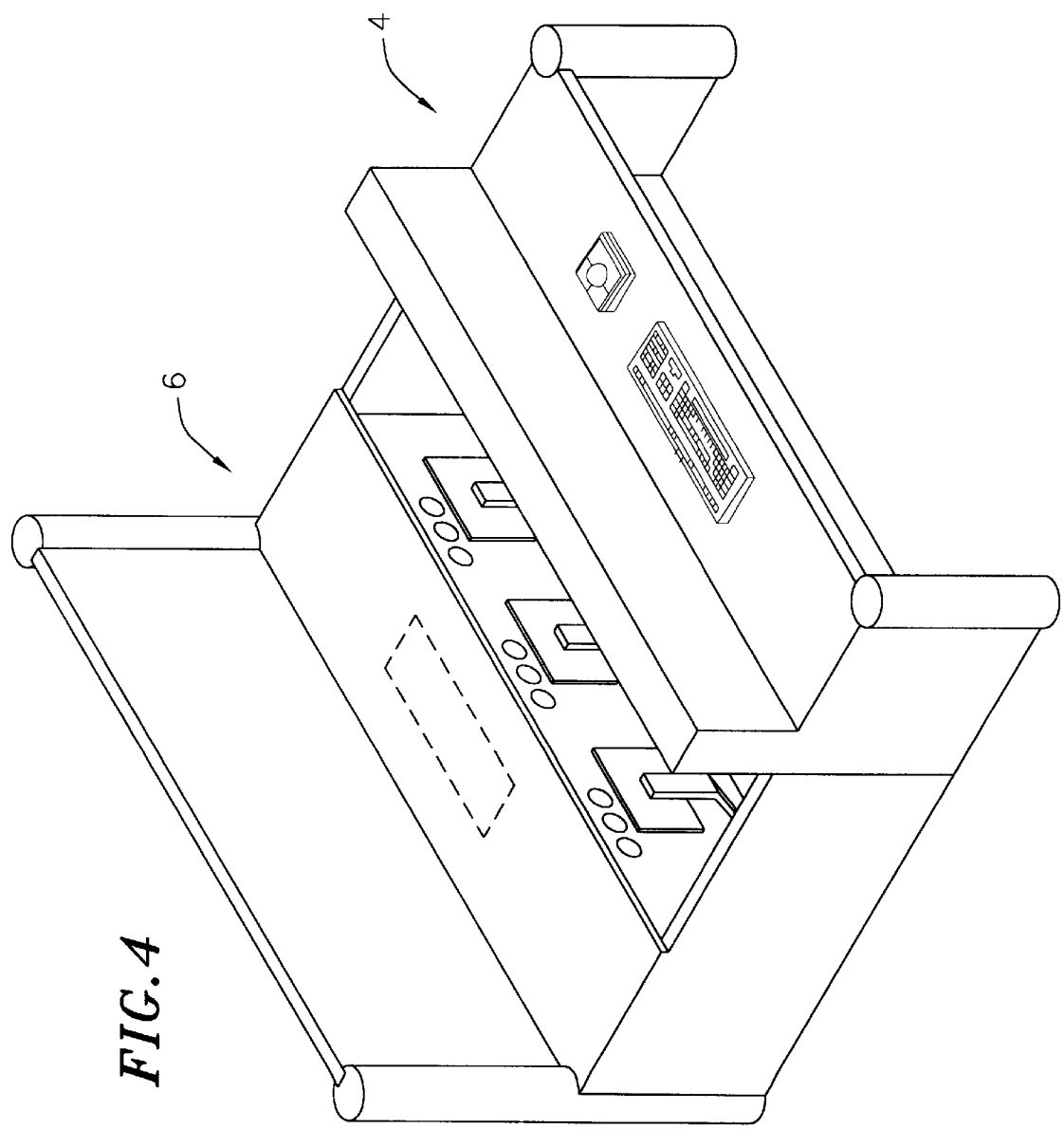
FIG. 4 is a perspective view of the projector/mirror submodule according to a preferred embodiment of the present invention.
Figure 5:
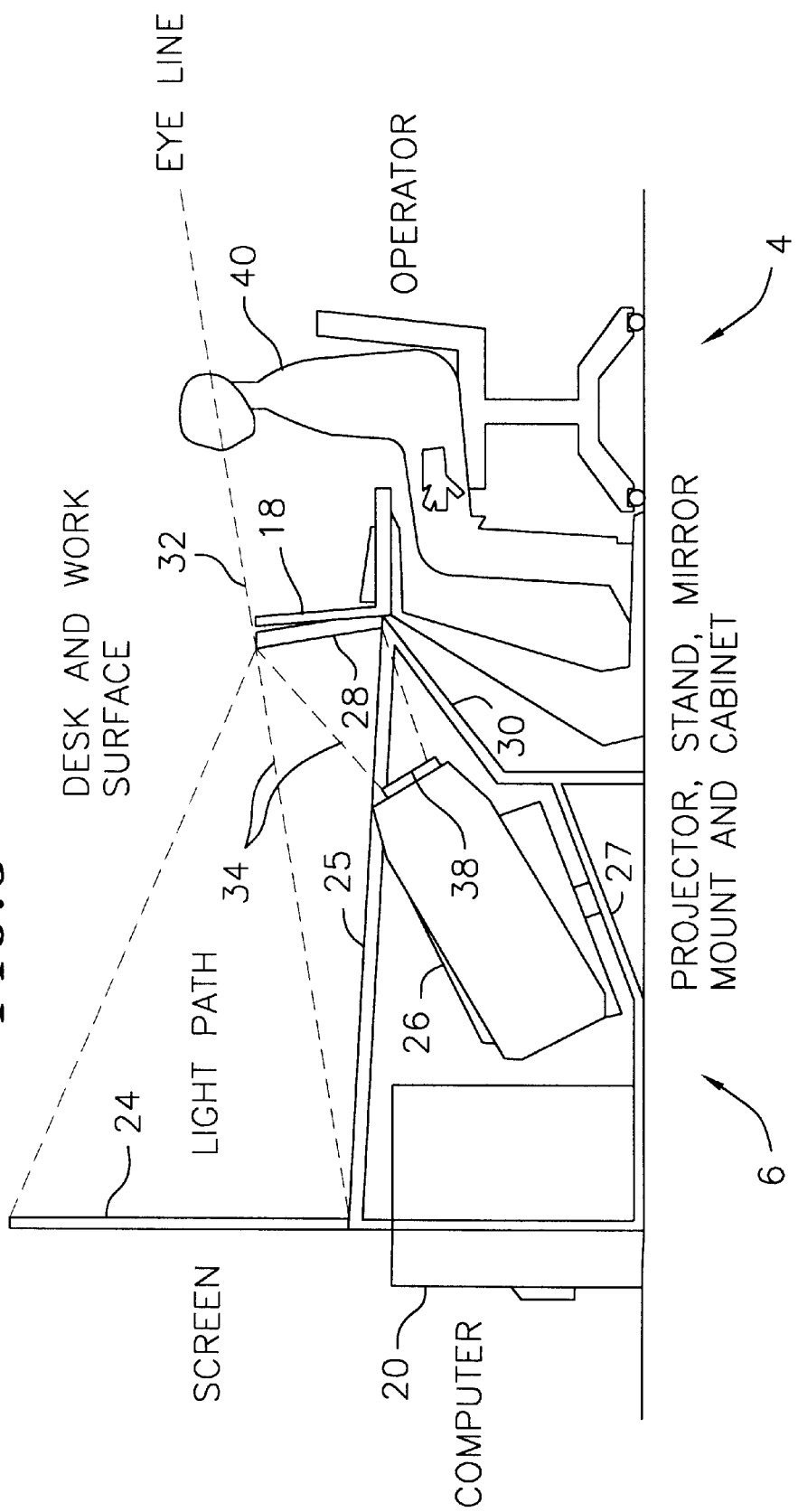
FIG. 5 is a perspective view of a plurality of projector/mirror submodules arranged side by side within the projection module.

Referring to FIGS. 4 and 5, the desk module 4 and projection/display module 6 are placed adjacent to one another to create a workstation that generally resembles a desk with a deep surface separated from a relatively large display positioned within the eye line of the operator. To the casual observer, the display section appears to be integrated with the desk unit. While the modules may be coupled or made part of an integral device, the two modules are preferably free-standing and slightly spaced apart in an interlocking operational arrangement. Vibration from activities performed on the desk are thus isolated from influencing the alignment of the projector/mirror/screen system. Between the barrier 18 and the viewing screen 24, the self-contained projection module positions the group of projectors below the eye line 32 and directs the light path 34 output from the projector to the front viewing screen.

For proper performance, the angle of the projector is controlled by the geometry of the stand and holds the projector in an angled, upward position. The mirror 28 is held in position by the integral arm 30 on the stand, and is positioned directly in front of the light emitted from the projector's individual red, green and blue display lenses 38. Conventional hardware (not shown) connecting the arm to the mirror allows for easy adjustment of the precise position and angle of the mirror. During setup, the mirrors are adjusted to cast the projected image back over the top of the projector without reflecting on the projector. The light continues toward the screen where all three colors are aligned to create an image. The projectors can be adjusted by well known techniques to assure a focused image on the display.

The projector/mirror submodules may be arranged in a number of ways. When arranged in a parallel row, the result is a substantially continuous image on a flat screen. In an angled projector arrangement with mirror centers closer together than projector centers, a concave curved screen appears to have a continuous image. In an angled arrangement in which the mirror centers are further apart than projector centers, a convex curved screen appears to have a continuous image.

In one embodiment of the present invention, the screen 24 is 3 ft×10 ft and is curved horizontally by 23 degrees and is a section of a cylinder. Other projection devices, different lenses, flat screens, rear projection screens and compound curved screens may also be used.

In operation, the operator 40 sits at the desk facing the large display screen 24 several feet in front of her. To create the image, as shown in FIG. 5, the host computer generates images that are overlapped and blended using known edge blending techniques.

Figure 6:
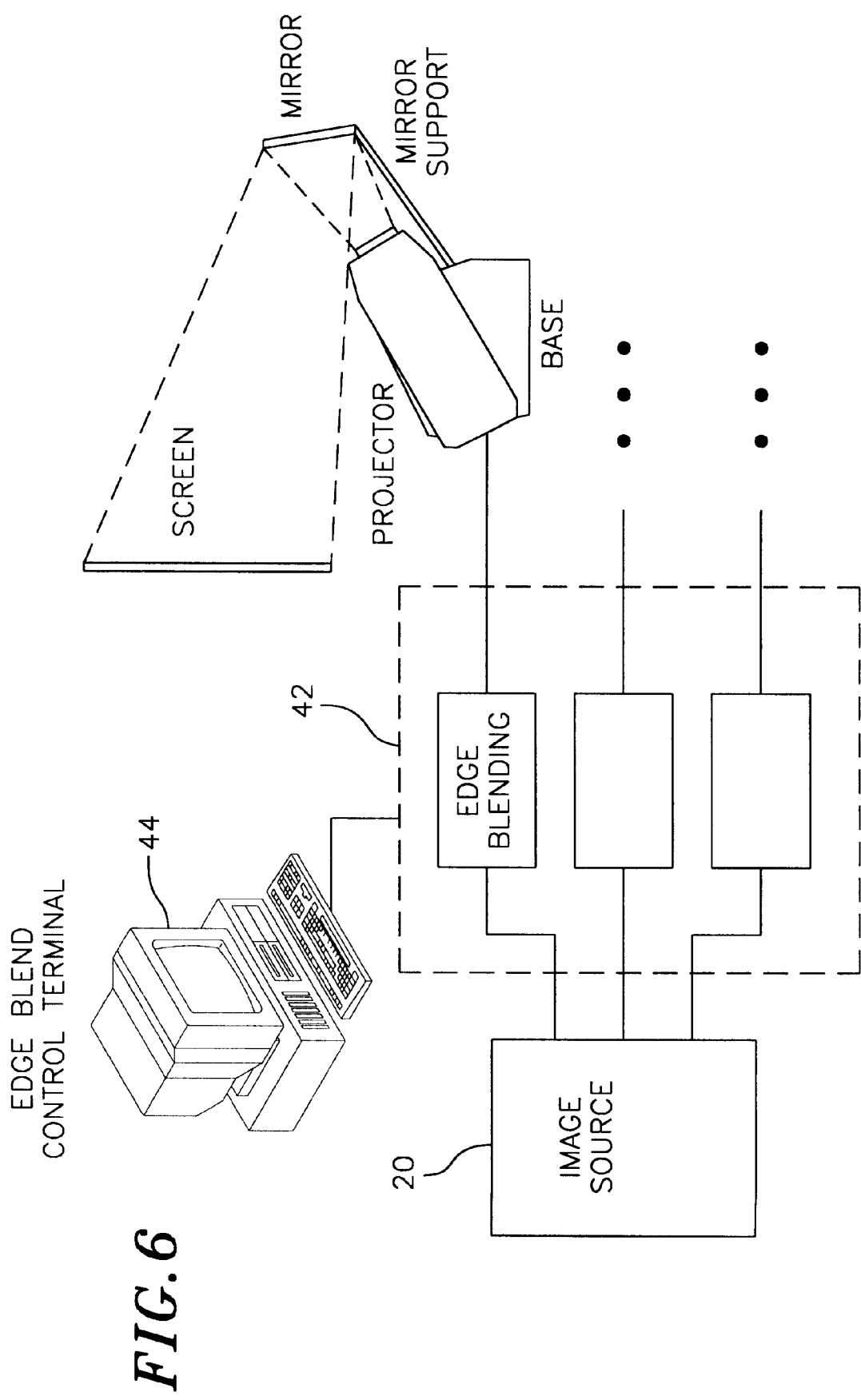
FIG. 6 is a diagram illustrating the image source and edge blending devices used in the workstation to create the seamless, high resolution projected display.

Referring to FIG. 6, in operation, the image producing host computer 20 provides input to the edge blending system 42, which may or may not be incorporated in the host computer. Examples of such edge blending systems are disclosed in U.S. Pat. No. 4,974,073 and 5,136,390 ("the '390 patent"), the contents of both of which are incorporated herein by reference. The systems disclosed in those patents allow the brightness of an image to be precisely adjusted across an entire video image. Coarse adjustments can be made to parameters of the brightness ramping curve, while fine adjustments can be made for specific detail elements to correct artifacts generated by the video components. A separate edge blend control terminal 44 may be used to implement the edge blending system.

The system disclosed in the '390 patent encompasses a method for smoothing the brightness of two adjoining overlapping video images produced from two discrete video signals which each have a plurality of detail elements (which may comprise a fraction of a pixel or a plurality of pixels) each with a brightness component. The method comprises applying a predetermined set of smoothing factors to the brightness components of the detail elements of the two signals, projecting the images as modified by the smoothing factors onto a display, modifying selected smoothing factors in response to the appearance of the projected display, and, finally, storing a representation of the smoothing factor modifications.

Utilizing the features disclosed therein, the system of the '390 patent enables a seamless multiple video image display to appear more consistent and uniform in brightness than a conventional single video image display. As a result, it is useful not only for displays with multiple overlapping video images, but also for smoothing the brightness of a single video image. In the preferred embodiment of the present invention, the features of the '390 patent are used to edge blend the images for high resolution display to create the wide angle workstation display.

Once blended, the image sources are delivered to the projectors 26 which produce a projected image that is reflected back through the mirrors 28 toward the display screen. The projection/display module 6 achieves its image by arranging projector modules below the eye line 32 of the viewer located adjacent the barrier 18. The folded light path allows all projection hardware to be packaged in front of and below the viewing position of those who are viewing the resulting image. The net effect is the creation of a computer viewing and control station with a large, high resolution panoramic display that may be comfortably viewed by a dozen or so people.

In a practical application, the large screen of the workstation is used among a group of individuals who may each be working at individual workstations. For reviews, demonstrations, design sessions in which more collaborative work practices may be of benefit, the host computer connected to the work station accesses the relevant data and the larger image may be seen by the whole group at once. In addition, the larger, more detailed image creates a wider and more complete frame of reference for viewing both three-dimensional and representational graphics and images as well as purely graphic forms such as spread-sheets, charts, graphs and type-based information.

The ergonomic scale of the image allows several individuals to view the image with the clarity and "in-eye" image size typically afforded by desktop monitors.

It will be understood by those of ordinary skill in the art that various modifications can be made to the embodiments described above without departing from the spirit and scope of the present invention. The workstation is generally an arrayed projection device consisting of a screen, projectors, stands, mirrors, mirror supports, desk, work surface, cabinet and support structure that functions as a unit. It may be a self standing front projection display, rear projection display, curved or flat or compound curved display. It may be used with or without the desk portion.

For example, although described as a desk, the workstation allows an operator to sit or stand at a desk or working surface and view a large, front projected array projection display that is housed in a device that sits in front of the operator and working surface.

Furthermore, although described as separate modular components, the desk and display portions can nonetheless be combined into a single integrated workstation. The components can be adjusted, and the display is scalable up and down as projection hardware permits. One or more projectors may be used, and the screen may be positioned at a variety of heights, depending on its application, room constraints or intended use. Similarly, the working surface of the desk can be positioned at a variety of heights, depending on its application, operator preferences or intended use.

What is claimed is:

1. A workstation comprising:
    an image source;
    an edge blending device coupled to the image source for edge blending images;
    a plurality of projectors coupled to the image source for generating a plurality of projected images;
    a screen for receiving the plurality of projected images; and
    a reflecting surface in an optical path of the projectors for directing the plurality of projected images toward the screen,
    wherein the projectors project the projected images toward an operator and the reflecting surface reflects the projected images away from the operator, and the screen, the plurality of projectors, and the reflecting surface are arranged such that the reflecting surface and the plurality of projectors are located below the eye level of the operator.

2. The workstation of claim 1, wherein the image source comprises a computer for generating, adjacent and at least partially overlapping video images.

3. The workstation of claim 2, wherein the computer is a host computer connected to a plurality of individual computer stations, the host computer comprising means for accessing image data from the individual computers to generate the video images.

4. The workstation of claim 1, wherein the reflecting surface comprises a mirror.

5. The workstation of claim 1, wherein each projector is associated with a discrete reflecting surface.

6. The workstation of claim 1, wherein the image source, the edge blending device, the plurality of projectors, and the reflecting surface are positioned below an eye line of the operator viewing the screen.

7. The workstation of claim 1 further comprising a projection module for housing the image source, the plurality of projectors and the reflecting surface, and for positioning the center of the screen proximately to the eye level of the operator viewing the screen.

8. The workstation of claim 7 further comprising a desk module having an operator work surface wherein the desk module is placed adjacent to the projection module for creating a resemblance of a desk with a surface separated from a display positioned with an eye line of the operator.

9. A workstation for use by an operator at a work desk viewing a display screen, the work desk having a work surface and a vertical border at one end of the work surface, the workstation comprising:
    an image source;
    a projector located between the screen and the operator; and
    a reflecting surface located below an eye level of the operator, the reflecting surface abutting the vertical border of the work desk;
    wherein the projector projects a projected image toward the operator and the reflecting surface reflects the projected image away from the operator, and the projector is in a fixed positional relationship with the reflecting surface and the screen by which an optical image generated by the projector reflects on the reflecting surface toward and onto the screen for creating an image thereon.

10. The workstation of claim 9 comprising multiple projectors generating a plurality of images.

11. The workstation of claim 9 comprising a smoothing device coupled to the image source for smoothing a brightness of the image.

12. A method of projecting images onto a display screen comprising the steps of:
    generating adjacent and overlapping video images;
    blending the video images to reduce appearance of a seam in overlaps between the video images;
    projecting the blended video images toward an operator and toward a reflecting surface located proximately to the operator; and
    a reflecting the blended video images toward the screen and away from the operator from below an eye level of an operator.

13. The method of claim 12, wherein the generating step comprises accessing image data from individual computers connected to a host computer.

14. The method of claim 12, wherein the step of reflecting comprises the step of directing the blended video images over a projector toward the screen without reflecting on the projector.

15. The workstation of claim 1, wherein the screen, the plurality of projectors and the reflecting surface are arranged as to compress a projection throw to allow a closest viewing of the plurality of projected images.

16. The workstation of claim 1, wherein the screen, the plurality of projectors and the reflecting surface are arranged as to preclude the operator from interfering with the plurality of projected images as to cast shadows on the screen.

17. The workstation of claim 1 further comprising a plurality of reflecting surfaces including the reflecting surface, each of the plurality of reflecting surfaces being located in an optical path of one of the plurality of projectors to direct a corresponding one of the plurality of projected images toward the screen, wherein the plurality of reflecting surfaces are placed such that each of the plurality of reflecting surfaces is located at a point of maximum width of the corresponding one of the plurality of projected images, beyond which adjacent ones of the plurality of projected images would overlap.

18. A workstation comprising:
    an image source;
    an edge blending device coupled to the image source for edge blending the images;
    a plurality of projectors coupled to the image source for generating a plurality of projected images, the plurality of projectors project the plurality of projected images toward an operator;
    a screen for receiving the plurality of projected images; and
    a plurality of reflecting surfaces, each of the plurality of reflecting surfaces located in an optical path of one of the plurality of projectors to direct corresponding one of the plurality of projected images away from the operator and toward the screen,
    wherein the screen, the plurality of projectors, and the plurality of reflecting surface are arranged such that the plurality of projectors and the plurality of reflecting surfaces are located below the eye level of the operator, a projection throw is compressed as to allow a closest viewing of the plurality of projected images, the operator is precluded from interfering with the plurality of projected images as to cast shadows on the screen, and the plurality of reflecting surfaces are placed such that each of the plurality of reflecting surfaces is located at a point of maximum width of corresponding one of the plurality of projected images, beyond which adjacent ones of the plurality of projected images would overlap.

19. The workstation of claim 18, wherein each of the plurality of projectors is mounted on one of a plurality of projection modules, each of the plurality of projection modules being a projector mount comprising a base for supporting one of the plurality of projectors, wherein each base, one of the plurality of projectors and one of the plurality of reflecting surfaces comprise a self-contained unit, and wherein the base coordinates position of an associated one of the plurality of reflecting surfaces at a specified minimum distance from an associated one of the plurality of projectors while achieving a maximum size for a composite display formed by arraying the plurality of projection modules to overlap the plurality of projection images.

20. The workstation of claim 18, wherein the plurality of projectors include a first projector and a second projector and the plurality of reflecting surfaces include a first reflecting surface and a second reflecting surface, the first projector and the second projector are associated with the first reflecting surface and the second reflecting surface, respectively, and wherein the screen is flat, the first projector is adjacent to the second projector, a distance between a center of the first reflecting surface and a center of the second reflecting surface is substantially the same as a distance between a center of the first projector and a center of the second projector and the projected images are directed to the screen to achieve an overlapped result.

21. The workstation of claim 18, wherein the plurality of projectors include a first projector and a second projector and the plurality of reflecting surfaces include a first reflecting surface and a second reflecting surface, the first projector and the second projector are associated with the first reflecting surface and the second reflecting surface, respectively, and wherein the screen is concave curved, the first projector is adjacent to the second projector, a distance between a center of the first reflecting surface and a center of the second reflecting surface is proportionally smaller than a distance between a center of the first projector and a center of the second projector and the projected images are directed to the screen to achieve an overlapped result when the plurality of projectors are arrayed along converging center lines.

22. The workstation of claim 18, wherein the plurality of projectors include a first projector and a second projector and the plurality of reflecting surfaces include a first reflecting surface and a second reflecting surface, the first projector and the second projector are associated with the first reflecting surface and the second reflecting surface, respectively, and wherein the screen is convex curved, the first projector is adjacent to the second projector, a distance between a center of the first reflecting surface and a center of the second reflecting surface is proportionally larger than a distance between a center of the first projector and a center of the second projector and the projected images are directed to the screen to achieve an overlapped result when the plurality of projectors are arrayed along diverging center lines.

* * * * *